Dec. 1, 1925.
B. W. McCLYMONT ET AL
1,563,385
VALVE
Filed May 22, 1925
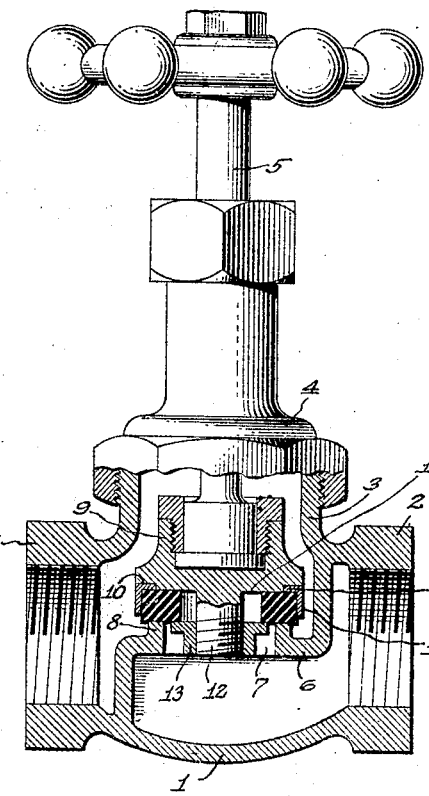
Fig. 1.
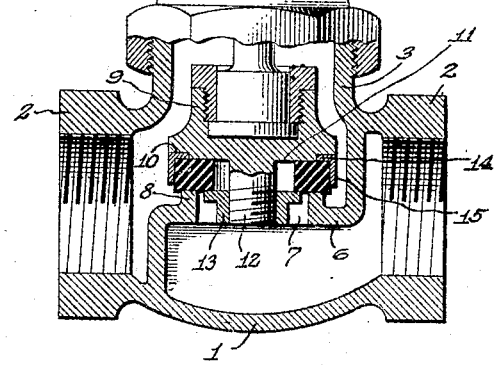
Fig. 2.
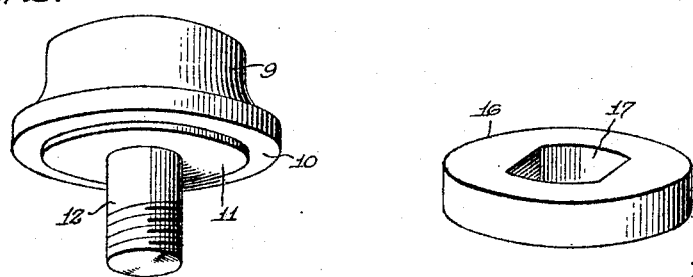
Fig. 3.
Fig. 4.
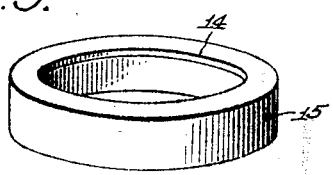
Inventor
Bryce W. McClymont
Seth J. North,
By
Attorneys Patented Dec. 1, 1925.

1,563,385

UNITED STATES PATENT OFFICE.

BRYCE W. McCLYMONT, OF WALKERVILLE, ONTARIO, CANADA, AND SETH J. NORTH, OF DETROIT, MICHIGAN.

VALVE.

Application filed May 22, 1925. Serial No. 32,003.

*To all whom it may concern:*

Be it known that we, BRYCE W. McCLYMONT and SETH J. NORTH, citizens of the United States, residing at Walkerville, county of Essex, Province of Ontario, Canada, and Detroit, county of Wayne, and State of Michigan, have invented certain new and useful Improvements in Valves, of which the following is a specification, reference being had therein to the accompanying drawings.

This invention relates to valves of that class commonly known as Jenkins valves wherein a valve member is held by a valve stem and is adapted to insure a non-leakable valve when the valve is closed. The valve member is ordinarily made of a packing material, as rubber or the like and in the early Jenkins Patent No. 362,630 of May 10, 1887, there are disclosed various ways of holding a removable disk or ring of packing. Such disks or rings have been extensively used in connection with various types of valves and in steam valves it is a well known fact that the packing becomes indurate, distorted, and of such configuration that it no longer serves its purpose and must be renewed. The hardened configuration of the packing and the manner in which it is mounted in its holder causes considerable trouble and difficulty when removing it. It is practically impossible to obtain a grip on the packing and when sharp tools are used to remove it the holder is often injured.

Our invention aims to provide positive and reliable means, in a manner as hereinafter set forth, for detachably holding a valve member or packing so that it may be expeditiously removed when occasion requires renewing. We accomplish this by a simple and durable construction that has been especially designed for steam valves but is applicable to various types of valves, either in the form to be hereinafter described or claimed, or possibly by slight modification or change, therefore we do not care to limit our invention other than set forth in the claims.

Reference will now be had to the drawing, wherein—

Figure 1 is a side elevation of the conventional form of globe steam valve, partly broken away and partly in section to show our improved valve member or packing;

Fig. 2 is a perspective view of a detached holder;

Fig. 3 is a similar view of a detached retaining member, and

Fig. 4 is a similar view of a detached valve member or packing disk.

In the drawing, the reference numeral 1 denotes a globe valve body having alining connections 2 for service pipes (not shown). The valve body has another connection 3 for the bonnet 4 of the valve and adjustable in said bonnet is a conventional form of valve stem 5 that may be shifted to and from a partition 6 in the valve body, said partition having an opening 7 surrounded by an upstanding rim or valve seat 8.

Detachably and rotatively connected to the inner end of the valve stem 5 is a holder 9 having a flat face 10 provided with an annular concentric boss or shoulder 11 and centrally of this boss or shoulder 11 is a screwthreaded stud 12 adapted to receive a flanged nut 13 of less diameter than the partition opening 7 so that it may enter said opening when the valve is closed or approximately so.

Detachably mounted on the flat face 10 of the holder 9 about the annular boss or shoulder 11, is the inturned annular flange 14 of a retaining member or ring 15. The flange 14 corresponds in depth to the shoulder or boss 11 so that the inner wall of the flange hub is flush with the face of the boss 11, and the diameter of the retaining member or ring 15 corresponds to the diameter of the holder 9 so that the outer wall of the retaining member or ring may be flush with the outer wall of the holder 9.

Mounted in the retaining member or ring 15 is a disk 16 of rubber or other packing material, said disk having a central opening 17 providing clearance for the stud 12. The disk 16 is of greater depth than the retaining member or ring 15 so as to protrude therefrom and be engageable with the valve seat or rim 8 of the partition 6, when the valve is closed, as shown in Figure 1. The flanged nut 13 is of greater area than the disk opening 17 so as to overlie the marginal edges of said opening, close said opening, and retain the packing disk against the boss 11. The opening 17 affords plenty of clearance for the stud 12 and the shape of the opening 17 may be such as to facilitate removal of it from its retaining member or ring.

Should the packing disk become worn and need renewing, it is only necessary to remove the nut 13 in order to remove the retaining member or ring from the holder 9. Then a hammer or suitable instrument may be employed to knock the packing disk from its retaining member or ring 15. This is accomplished without injury to the holder or retaining member and a new packing disk may be easily and quickly installed.

What we claim is:—

1. In a valve of the type described, a stem supported holder having a boss and stud, a retaining member on said holder having an annular flange engaging the boss of said holder, a packing disk in said retaining member seated against said flange and the boss of said holder, and means on said stud holding said packing disk in said retaining member and against the boss of said holder.

2. The combination of a packing disk holder having a boss and a stud, a retaining member having an annular flange about the boss of said holder, and a packing disk seated in said retaining member on the flange thereof and on the boss of said holder, said packing disk being removable from said retaining member by pressure against that portion of said packing disk exposed at the flange of said retaining member.

3. The combination with a valve having a valve seat and an adjustable stem, of a holder carried by said stem and provided with an annular boss and a concentric stud, a detachable retaining member on said holder and flush with the outer walls thereof, said retaining member having an annular flange about the boss of said holder, a packing disk seated in said retaining member and on the boss of said holder and adapted for engagement with the valve seat of said valve, said packing disk having an opening providing clearance for said stud, and a nut on said stud against said packing disk and closing the opening of said packing disk.

In testimony whereof we affix our signatures.

BRYCE W. McCLYMONT.
SETH J. NORTH.